United States Patent [19]

Angerer et al.

[11] Patent Number: 6,054,511
[45] Date of Patent: *Apr. 25, 2000

[54] HIGH SOLIDS LOW VISCOSITY POLYSACCHARIDES

[75] Inventors: J David Angerer; Jashawant Jamanadas Modi, both of Hockessin, Del.; Robert C Szafranski, Hopewell, Va.

[73] Assignee: Aqualon Company, Wilmington, Del.

[*] Notice: This patent is subject to a terminal disclaimer.

[21] Appl. No.: 08/006,025

[22] Filed: Jan. 15, 1993

Related U.S. Application Data

[63] Continuation of application No. 07/546,866, Jul. 2, 1990, abandoned.

[51] Int. Cl.[7] ........................... C08L 1/26; C08L 1/28
[52] U.S. Cl. ....................... 524/42; 524/43; 524/44; 524/45; 524/46; 524/55; 536/84; 536/88; 536/90; 536/91
[58] Field of Search ................... 524/44, 42, 43, 524/45, 46, 55; 536/84, 88, 90, 91

[56] References Cited

U.S. PATENT DOCUMENTS

| | | | |
|---|---|---|---|
| 3,132,075 | 5/1964 | Johnson | 524/44 |
| 3,296,248 | 1/1967 | Logan | 536/88 |
| 3,391,135 | 7/1968 | Ouno et al. | 536/88 |
| 3,728,331 | 4/1973 | Savage | 536/88 |
| 3,741,922 | 6/1973 | Glomski et al. | 524/44 |
| 3,769,247 | 10/1973 | Glomski et al. | 254/44 |
| 4,186,250 | 1/1980 | Garrett et al. | 106/6 |
| 4,302,440 | 11/1981 | John et al. | 424/35 |
| 4,316,982 | 2/1982 | Holst et al. | 536/88 |
| 4,435,531 | 3/1984 | Nakayama et al. | 524/37 |
| 4,641,579 | 2/1987 | Bernstein | 106/2 |
| 4,854,969 | 8/1989 | Bassemir et al. | 106/2 |
| 5,006,168 | 4/1991 | Modi et al. | 106/2 |
| 5,080,717 | 1/1992 | Young | 106/197.1 |
| 5,093,485 | 3/1992 | Svensson | 536/91 |

*Primary Examiner*—Jeffrey C. Mullis
*Attorney, Agent, or Firm*—David Edwards

[57] ABSTRACT

Hydroxyethylcellulose (HEC), hydrophobically modified hydroxyethylcellulose (HMHEC), hydroxypropylcellulose (HPC), methylhydroxypropylcellulose (MHPC), carboxymethylhydroxyethylcellulose (CMHEC), guar, starch, xanthan, hydroxypropylguar (HP Guar) or carboxymethylhydroxypropylguar (CMHP Guar) are stepwise or continuously reacted with hydrogen peroxide to produce aqueous compositions with a solids content greater than 5% by weight at a viscosity at 25° C. below 9500 mPa.s. It is preferred to use 30–50% hydrogen peroxide to depolymerize the polysaccharide.

7 Claims, No Drawings

6,054,511

HIGH SOLIDS LOW VISCOSITY POLYSACCHARIDES

This application is a continuation, of application Ser. No. 07/546,866 filed Jul. 2, 1990 now abandoned.

FIELD OF THE INVENTION

The invention relates to water soluble polymers. In particular, the invention relates to oxidatively-degraded polysaccharides useful as fluid additives.

BACKGROUND OF THE INVENTION

Polysaccharides such as cellulose ethers and guar gum, etc., are known in a wide variety of applications for food, cosmetics, pharmaceuticals, oil drilling, coatings, construction, graphic arts, etc. Because these naturally occurring polymers have high molecular weights, it has often been desirable to employ a oxidative treatment to degrade the polymer. Degradative polysaccharide treatments and low viscosity polymers are described in Canadian patent 839,258, British patent specification 1,139,637 and U.S. Pat. Nos. 4,316,982; 4,838,944; 4,874,854; and 4,894,448.

Yet in spite of what was known in the art and the existence of a continuing need for new and useful aqueous polysaccharide compositions, it remained for the present invention to provide such novel compositions along with a novel process for producing these compositions.

SUMMARY OF THE INVENTION

An aqueous polysaccharide composition is characterized in that the composition has a solids content greater than 5% by weight and a viscosity at 25° C. below 9500 mPa.s, where the polysaccharide composition contains at least one polysaccharide selected from the group of hydroxyethylcellulose (HEC), hydroxypropylcellulose (HPC), water soluble ethylhydroxyethylcellulose (EHEC), carboxymethylhydroxyethylcellulose (CMHEC), hydroxypropylhydroxyethylcellulose (HPHEC), methylcellulose (MC), methylhydroxypropylcellulose (MHPC), methylhydroxyethylcellulose (MHEC), carboxymethylmethylcellulose (CMMC), guar, carboxymethyl guar (CM guar), hydroxyethyl guar (HE guar), hydroxypropyl guar (HP guar), carboxymethylhydroxypropyl guar (CMHP guar), cationic guar, hydrophobically modified carboxymethylcellulose (HMCMC). hydrophobically modified hydroxyethylcellulose (HMHEC), hydrophobically modified hydroxypropylcellulose (HMHPC), hydrophobically modified ethylhydroxyethylcellulose (HMEHEC), hydrophobically modified carboxymethylhydroxyethylcellulose, (HMCMHEC), hydrophobically modified hydroxypropylhydroxyethylcellulose (HMHPHEC), hydrophobically modified methylcellulose (HMMC), hydrophobically modified methylhydroxypropylcellulose (HMMHPC), hydrophobically modified methylhydroxyethylcellulose (HMMHEC), hydrophobically modified carboxymethylmethylcellulose (HMCMMC), hydrophobically modified guar (HM guar), hydrophobically modified carboxymethylguar (HMCM guar), hydrophobically modified hydroxyethylguar (HMHE guar), hydrophobically modified hydroxypropylguar (HMHP guar), hydrophobically modified carboxymethylhydroxypropylguar (HMCMHP guar), hydrophobically modified cationic guar (HM cationic guar), starch, xanthan gum, cationic hydroxyethylcellulose. cationic MHPC, cationic HPC and cationic HMHEC.

The invention provides a simple and efficient process for producing a high solids, low viscosity aqueous polysaccharide product with a percent solids greater than 5% and a Brookfield viscosity at 25° C. below 9500 mpa.s comprising the steps:

(1) preparing a mixture of a 5 to 50% solids aqueous polysaccharide composition and an oxidizing agent capable of depolymerizing the polysaccharide, and (2) reacting the polysaccharide and oxidizing agent batchwise, incrementally or continuously to produce a product.

A preferred process for producing a high solids low viscosity aqueous polysaccharide composition comprises the steps:

1. reacting a polysaccharide at a solids content of up to 15% by weight with an oxidizing agent;
2. adding additional oxidizing agent and polysaccharide and reacting at a solids content of 10 to 20% by weight with an oxidizing agent;
3. adding additional oxidizing agent and polysaccharide and reacting at a solids content of 15 to 25% by weight with an oxidizing agent;
4. adding additional oxidizing agent and polysaccharide and reacting at a solids content of 20 to 30% by weight with an oxidizing agent; and
5. terminating the reaction and recovering an aqueous polysaccharide composition with a solids content above 30% and a viscosity below 9500 mPa.s at 25° C.

The preferred aqueous polysaccharides are carboxymethylcellulose (CMC), hydroxyethylcellulose (HEC), hydroxypropylcellulose (HPC), water soluble ethylhydroxyethylcellulose (EHEC), carboxymethylhydroxyethylcellulose (CMHEC), hydroxypropylhydroxyethylcellulose (HPHEC), methylcellulose (MC), methylhydroxypropylcellulose (MHPC), methylhydroxyethylcellulose (MHEC), carboxymethylmethylcellulose (CMMC), guar, carboxymethyl guar (CM Guar), hydroxyethylguar (HE guar), methylhydroxypropylguar (MHP guar), hydroxypropylguar (HP guar), carboxymethylhydroxypropylguar (CMHP Guar), cationic guar, hydrophobically modified hydroxyethylcellulose (HMHEC) or hydrophobically modified ethylhydroxyethylcellulose (HMEHEC). The preferred oxidizing agent is 30–50% hydrogen peroxide.

DETAILED DESCRIPTION OF THE INVENTION

Guar and modified polysaccharides useful for the practice of the present invention are well known in the art and are commercially available as solids, solutions and suspensions. But in spite of a need which could not be met by conventional oxidatively-degraded polysaccharides, it remained for the present invention to satisfy that need.

While hydrogen peroxide is the preferred oxidizing agent, any equivalent oxidizing agent could be substituted which could similarly degrade the modified polysaccharide to the same solids content and viscosity level. An advantage provided by hydrogen peroxide used without a metal catalyst is that food and pharmaceutical grade materials may be produced starting with higher viscosity food or pharmaceutical grade polysaccharides. Although it is certainly possible to degrade the polysaccharides using other than 30–50% hydrogen peroxide, the added water would have to be adjusted to ultimately obtain the high solids, low viscosity compositions of the invention. The amount of hydrogen peroxide required for depolymerization has been found to vary according to the polysaccharide.

Whereas it had been previously known to react cellulosic materials such as CMC, HEC and HPC heterogeneously in organic diluents with 6 to 10% hydrogen peroxide solutions in order to reduce viscosity; it has now been discovered that new and useful compositions can be obtained in situ in water. The process of the invention can be carried out in conventional laboratory and plant scale apparatus and equipment familiar to producers of polysaccharide products. Additional details are contained in the examples which illustrate the practice of the invention without being limiting.

In the process according to the invention, dissolution and viscosity reduction occur simultaneously as modified polysaccharide is reacted with oxidant in water. It has been discovered that the reaction is best when the oxidant is added to the water and the polysaccharide is added afterward. Otherwise, a phenomenom known as "gel blocking" occurs where a gel layer forms on the outside of large lumps of polymer; this dissolves only very slowly. This follows for the subsequent steps of the process where additional hydrogen peroxide is allowed to mix in thoroughly before additional polymer is added. It is envisioned that the process of the invention can be automated using viscosity measurements to control oxidant additions followed by polysaccharide additions, thereby allowing for a continuous rather than an incremental or batchwise process. In certain cases sufficient oxidant and polysaccharide and/or modified polysaccharide may be initially added such that a single stage process is sufficient.

A generalized process for producing a high solids low viscosity aqueous polysaccharide composition comprises the steps:

(1) reacting a polysaccharide at a solids content of 5 to 15% by weight with an oxidizing agent;

(2) adding additional polysaccharide and reacting at a solids content of 10 to 20% by weight with an oxidizing agent;

(3) adding additional polysaccharide and reacting at a solids content of 15 to 25% by weight with an oxidizing agent; and (4) terminating the reaction and recovering an aqueous polysaccharide composition with a solids content above 20% and a viscosity below 9500 mPa.s at 25° C. A particularly useful application for this generalized process involves the use of CMC, HPC or guar as the polysaccharide where 50% hydrogen peroxide is used in step (1). This process may be continuous, incremental or batchwise.

A preferred process with more detail than that contained in the Summary of the Invention follows.

A process for producing aqueous polysaccharide compositions with a solids content greater than 30% by weight and having a viscosity at 25° C. below 9500 mPa.s where the polysaccharide composition contains at least one modified polysaccharide selected from the group of carboxymethylcellulose (CMC), hydroxyethylcellulose (HEC), hydrophobically modified hydroxyethylcellulose (HMHEC), hydroxypropylcellulose (HPC), methylhydroxypropylcellulose (MHPC), hydrophobically modified water soluble ethylhydroxyethylcellulose (HMEHEC), hydroxypropylguar (HP Guar), carboxymethylhydroxyethylcellulose (CMHEC) or carboxymethylhydroxypropylguar (CMHP guar) which comprises the steps:

(1) reacting a polysaccharide with one or more modifying agents to produce a modified polysaccharide;

(2) separating the modified polysaccharide from reaction impurities using a water-solvent mixture;

(3) reacting the modified polysaccharide with hydrogen peroxide in a stirred container at a solids content of 5 to 15% by weight;

(4) adding additional hydrogen peroxide and modified polysaccharide and reacting at a solids content of 10 to 20% by weight;

(5) adding additional hydrogen peroxide and modified polysaccharide and reacting at a solids content of 15 to 25% by weight;

(6) adding additional hydrogen peroxide and modified polysaccharide and reacting at a solids content above 25% by weight; and (7) terminating the reaction and recovering an aqueous polysaccharide composition.

It should be noted in this preferred process that the modified polysaccharide need not be a single material or necessarily the same in each step. Thus, for example, CMC could be added in steps (3) and (4) and HEC could be added in steps (5) and (6) to produce a high solids, low viscosity mixture of CMC and HEC.

Hydrogen peroxide is the preferred oxidant for the practice of the invention, but other oxidants can be used as long as they similarly depolymerize the polysaccharide without producing objectionable by-products. Commercially available 50% hydrogen peroxide is particularly suitable when water addition must be kept as low as possible.

The following examples illustrate the practice of the invention which has industrial applicability in food, pharmaceuticals, coatings, printing, paper, construction, cosmetics and oil drilling. Unless otherwise specified, all percentages and parts are by weight.

EXAMPLE 1

Carboxymethylcellulose (CMC) was prepared in aqueous isopropanol and purified with aqueous methanol. It was then dried and granulated.

First Stage

A reactor was cleaned and dried and 545 kg of water was added and heated to 80° C. Agitation was set at 130 rpm. Then 3.5 kg 50% hydrogen peroxide was added followed by 68 kg of CMC which was added in about 45 minutes. The reaction proceeded for 75 minutes after completion of the CMC addition.

Second, Third and Fourth Stages

In each stage, 3.5 kg 50% hydrogen peroxide was added followed by 68 kg CMC. A period of 30 to 60 minutes was provided for the CMC addition and this stage was complete in two hours. The reaction mixture was periodically measured for viscosity and residual hydrogen peroxide. Additional CMC was added when solution viscosity fell below 2000 mPa.s and additional hydrogen peroxide was added when less than 100 ppm was detected.

Fifth Stage

At the completion of the fourth stage, 1.25 kg of methyl parasept was added as a preservative. The reaction mixture was cooled to 50° C. and filtered through a 40 micron filter into storage drums. A product with a Brookfield viscosity of 1050 mPa.s at 25° C. was obtained with a solids content of 31.1%. Residual hydrogen peroxide was below 20 ppm. A color comparison with three commercially available gum arabic solutions showed comparable results, i.e., yellowness index number for CMC product 281 versus 350, 347, 280 for gum arabics.

EXAMPLE 2

The procedure of Example 1 was repeated except that CMC with different levels of substitution ranging from 0.2 to 1.2 was used as the starting material. Products were produced in all cases with percent solids ranging up to about 50% along with a 25° C. Brookfield viscosity of 9400 mPa.s or less.

EXAMPLE 3

The procedure of Example 1 was repeated except that the starting material was selected from guar, carboxymethylhydroxyethylcellulose (CMHEC), hydrophobically modified hydroxyethylcellulose (HMHEC) (available from the Aqualon Company as Natrosol® Plus), methylhydroxypropylcellulose (MHPC), hydroxyethylcellulose(HEC), carboxymethylguar (CM Guar), hydroxypropylguar (HP Guar) and carboxymethylhydroxypropylguar (CMHP Guar). Amounts of hydrogen peroxide and polysaccharide were varied to give percent solids ranging from 10 to 50%. Corresponding viscosities of from 44 to 7800 were obtained.

EXAMPLE 4

A 703 g portion of 50% hydrogen peroxide was added to 23.5 kg water which was constantly stirred. After heating to 80° C., 10.9 kg, hydroxyethylcellulose (HEC) was added over a 30 minute period. Reaction was carried out at 90–95° C. for about 7 hours. The reaction mixture was cooled to 70° C. and 52 g of methyl parasept was added as a preservative. A 30% solids composition was obtained with a Brookfield viscosity at 25° C. of 1000 mPa.s. Very high intermediate viscosities, 1–2 MM mPa.s, were observed, such that powerful agitation was required.

What is claimed is:

1. An aqueous cellulose composition consisting essentially of at least one cellulose ether selected from the group consisting of cationic hydroxyethylcellulose, methylcellulose, methylhydroxypropylcellulose, hydroxypropylhydroxyethylcellulose, carboxymethylhydroxyethylcellulose and hydrophobically modified ethylhydroxyethylcellulose, characterized in that the aqueous cellulose composition has a solids content greater than 15% by weight and a Brookfield viscosity below 9500 mPa.s. at 25° C.

2. The composition of claim 1 with a solids content greater than 25% by weight.

3. The composition of claim 1 with a solids content greater than 30% by weight.

4. The composition of claim 1 further comprising carboxymethylcellulose.

5. The composition of claim 1 further comprising hydroxypropylcellulose.

6. An aqueous composition as in claim 1 further comprising hydroxyethylcellulose.

7. An aqueous composition as in claim 1 further comprising guar or a guar derivative.

* * * * *